(12) United States Patent
Schwerdtner

(10) Patent No.: US 8,437,056 B2
(45) Date of Patent: May 7, 2013

(54) ANALYTICAL METHOD FOR COMPUTING VIDEO HOLOGRAMS IN REAL TIME

(75) Inventor: Alexander Schwerdtner, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 552 days.

(21) Appl. No.: 12/600,343

(22) PCT Filed: May 16, 2008

(86) PCT No.: PCT/EP2008/056024
§ 371 (c)(1),
(2), (4) Date: Nov. 16, 2009

(87) PCT Pub. No.: WO2008/138981
PCT Pub. Date: Nov. 20, 2008

(65) Prior Publication Data
US 2010/0149312 A1    Jun. 17, 2010

(30) Foreign Application Priority Data
May 16, 2007 (DE) .......................... 10 2007 023 785

(51) Int. Cl.
*G03H 1/08* (2006.01)
(52) U.S. Cl.
USPC .................................................. 359/9
(58) Field of Classification Search .................... 348/41; 359/9, 22
See application file for complete search history.

(56) References Cited

U.S. PATENT DOCUMENTS

| 5,400,155 | A  |   | 3/1995  | Ueda et al. |            |
|-----------|----|---|---------|-------------|------------|
| 5,793,503 | A  | * | 8/1998  | Haines et al. | 359/9    |
| 5,850,352 | A  | * | 12/1998 | Moezzi et al. | 345/419  |
| 6,952,204 | B2 | * | 10/2005 | Baumberg et al. | 345/420 |
| 7,230,746 | B2 | * | 6/2007  | Cameron et al. | 359/9   |
| 7,262,891 | B2 | * | 8/2007  | Brotherton-Ratcliffe et al. | 359/22 |
| 7,295,200 | B2 | * | 11/2007 | Cameron et al. | 345/419 |

(Continued)

FOREIGN PATENT DOCUMENTS

| DE | 10 2006 004 300 | 8/2007 |
| DE | 10 2006 042 324 | 3/2008 |

(Continued)

OTHER PUBLICATIONS

International Search Report, dated Jul. 21, 2009, issued in priority International Application No. PCT/EP2008/056024.
Lucente, M., "Interactive computation of holograms using a look-up table," J. electronic Imagine, vol. 2(1), pp. 28-34 (Jan. 1993).

*Primary Examiner* — David Eng
(74) *Attorney, Agent, or Firm* — Saul Ewing LLP

(57) ABSTRACT

An analytical method for computing a video hologram for a holographic reproduction device having at least one light modulation means is disclosed, wherein a scene split into object points is encoded as a whole hologram and can be seen as a reconstruction from a visibility region, located within a periodicity interval of the reconstruction. The visibility region, together with each object point of the scene to be reconstructed, defines a subhologram and the whole hologram is generated from a superposition of subholograms, wherein the complex hologram values of a subhologram are determined from the wave front of the respective object point to be reconstructed in a modulator region of the light modulation means, by calculating and evaluating the transmission or modulation functions of an imaging element formed in the modulator region. The object point to be reconstructed is located in the focal point of the imaging element.

12 Claims, 5 Drawing Sheets

U.S. PATENT DOCUMENTS

| | | | |
|---|---|---|---|
| 7,423,792 B2 * | 9/2008 | Brotherton-Ratcliffe et al. | 359/35 |
| 7,548,360 B2 * | 6/2009 | Brotherton-Ratcliffe et al. | 359/35 |
| 7,636,184 B2 * | 12/2009 | Schwerdtner | 359/9 |
| 7,649,532 B2 * | 1/2010 | Cameron et al. | 345/419 |
| 7,768,684 B2 * | 8/2010 | Cameron et al. | 359/9 |
| 7,929,189 B2 * | 4/2011 | Schwerdtner | 359/9 |
| 7,969,633 B2 * | 6/2011 | Schwerdtner | 359/9 |
| 2006/0139711 A1 | 6/2006 | Leister et al. | |

FOREIGN PATENT DOCUMENTS

| | | |
|---|---|---|
| WO | WO 2004/044659 | 5/2004 |
| WO | WO 2006/027228 | 3/2006 |
| WO | WO 2006/041191 | 4/2006 |
| WO | WO 2006/066919 | 6/2006 |
| WO | WO 2006/119760 | 11/2006 |

* cited by examiner

ANALYTICAL METHOD FOR COMPUTING VIDEO HOLOGRAMS IN REAL TIME

CROSS REFERENCE TO RELATED APPLICATIONS

This application claims the priority of PCT/EP2008/056024, filed on May 16, 2008, which claims priority to German Application No. 10 2007 023785.7, filed May 16, 2007, the entire contents of which are hereby incorporated in total by reference.

BACKGROUND OF THE INVENTION

The present invention relates to an analytic method for computing video holograms for a holographic display device in real time.

Such a holographic display device is substantially based on the principle that a sub-hologram is defined together with each object point of the scene to be reconstructed and that the entire hologram is formed by superposition of sub-holograms, with the help of at least one light modulator means on which a scene which is divided into object points is encoded as an entire hologram and where the scene can be seen as a reconstruction from a visibility region which lies within one periodicity interval of the reconstruction of the video hologram. In general, the principle is to reconstruct mainly that wave front that would be emitted by an object into one or multiple visibility regions. In detail, such a device is based on the principle that the reconstruction of an individual object point only requires a sub-hologram as a subset of the entire hologram encoded on the light modulator means. The holographic display device comprises at least one screen means. The screen means is either the light modulator itself, where the hologram of a scene is encoded, or an optical element—such as a lens or a mirror—onto which a hologram or wave front of a scene encoded on the light modulator is imaged.

The definition of the screen means and the corresponding principles for the reconstruction of the scene in the visibility region are described in other documents filed by the applicant. In documents WO 2004/044659 and WO 2006/027228, the light modulator itself forms the screen means. In document WO 2006/119760, titled "Projection device and method for holographic reconstruction of scenes", the screen means is an optical element onto which a hologram which is encoded on the light modulator is imaged. In document DE 10 2006 004 300, titled "Projection device for the holographic reconstruction of scenes", the screen means is an optical element onto which a wave front of the scene encoded on the light modulator is imaged. Document WO 2006/066919 filed by the applicant describes a method for computing video holograms.

A 'visibility region' is a limited region through which the observer can watch the entire reconstruction of the scene at sufficient visibility. Within the visibility region, the wave fields interfere such that the reconstructed scene becomes visible for the observer. The visibility region is located on or near the eyes of the observer. The visibility region can be moved in the x, y and z directions and is tracked to the actual observer position with the help of known position detection and tracking systems. It is possible to use two visibility regions, one for each eye. Generally, more complex arrangements of visibility regions are also possible. It is further possible to encode video holograms such that individual objects or the entire scene seemingly lie behind the light modulator for the observer.

In this document, the term 'light modulator means' or 'SLM' denotes a device for controlling intensity, colour and/or phase of light by way of switching, gating or modulating light beams emitted by one or multiple independent light sources. A holographic display device typically comprises a matrix of controllable pixels, which reconstruct object points by modifying the amplitude and/or phase of light which passes through the display panel. A light modulator means comprises such a matrix. The light modulator means may for example be an acousto-optic modulator AOM or a continuous-type modulator. One embodiment for the reconstruction of the holograms by way of amplitude modulation can take advantage of a liquid crystal display (LCD). The present invention also relates to further controllable devices which are used to modulate sufficiently coherent light into a light wave front or into a light wave contour.

The term 'pixel' denotes a controllable hologram pixel of the light modulator, it represents a discrete value of the hologram point and is addressed and controlled discretely. Each pixel represents a hologram point of the hologram. In the case of an LC display, a pixel is a discretely controllable display pixel. In the case of a DMD (Digital Micro-mirror Device), such as a DLP (Digital Light Processor), a pixel is a discretely controllable micro-mirror or small group of such mirrors. In the case of a continuous light modulator means, a pixel is an imaginary region which represents the hologram point. In the case of a colour representation, a pixel is typically sub-divided into multiple sub-pixels, which represent the primary colours.

The term 'transformation' shall be construed such to include any mathematical or computational technique which is identical to or which approximates a transformation. Transformations in a mathematical sense are merely approximations of physical processes, which are described more precisely by the Maxwellian wave equations. Transformations such as Fresnel transformations or the special group of transformations which are known as Fourier transformations, describe second-order approximations. Transformations are usually represented by algebraic and non-differential equations and can therefore be handled efficiently and at high performance using known computing means. Moreover, they can be modelled precisely using optical systems.

Document WO 2006/066919 filed by the applicant describes a method for computing video holograms. It generally includes the steps of slicing the scene into section planes which are parallel to the plane of a light modulator, transforming all those section planes into a visibility region and to add them up there. Then, the added results are back-transformed into the hologram plane, where also the light modulator is disposed, thus determining the complex hologram values of the video hologram.

Document DE 10 2006 042 324 describes a method for the real-time generation of video holograms. That method uses the principle that the reconstruction of a single object point only requires a sub-hologram as a subset of the entire hologram which is encoded on the SLM. It is characterised in that for each object point the contributions of the sub-holograms can be retrieved from look-up tables, and that said sub-holograms are accumulated so to form an entire hologram in order to reconstruct the entire scene.

The former method for the generation of video holograms for interactive real-time representations can only be realised with great efforts being put into resources. Moreover, because of the great number of complex computing steps, the generation of the video holograms causes a great computational load and requires high-performance and costly computing units. As a result of the long computation times there is the risk that video sequences and interactive three-dimensional real-time applications cannot be provided with the desired refresh frequency.

As in conventional video technologies, a high image refresh rate is desired and indispensable when displaying computer-generated video holograms. The cited methods further exhibit the disadvantage that hologram values can only be generated for object points, which represent certain discrete positions or positions of discrete section layers.

SUMMARY OF THE INVENTION

It is the object of the present invention to overcome this disadvantage of the prior art. A method is to be provided which allows hologram values to be computed for object points at any position inside the reconstruction space or frustum. The corresponding hologram values are to be computed in real time. An additional object of the invention is to significantly reduce the effort needed to compute the hologram values and thus to support the real-time capability of the method.

The method for generating video holograms according to this invention is suited for holographic display devices with at least one light modulator means on which a scene which is divided into object points is encoded as an entire hologram and where the scene can be seen as a reconstruction from a visibility region which lies within one periodicity interval of the reconstruction of the video hologram, where a sub-hologram is defined by the visibility region together with each object point of the scene to be reconstructed and where the entire hologram is formed by a superposition of sub-holograms. Such a holographic display device with light modulator means is based on the principle that the wave fronts which are modulated with the information of object points of a scene are superposed in at least one visibility region. The definition of a visibility region has already been given above.

Further, advantage is taken of the principle that the reconstruction of an individual object point of a scene only requires a sub-hologram as a subset of the entire hologram encoded on the light modulator means. Each single object point is created by one sub-hologram, whose position depends on the position of the object point, and whose size depends on the observer position. The region of the sub-hologram on the light modulator means will be referred to below as modulator region. The modulator region is that sub-region of the light modulator means which is required for reconstructing the object point. At the same time, the modulator region defines which pixels on the light modulator must be addressed in order to reconstruct that object point. The modulator region will remain in a fixed position if the object point is an object point which is fixed in space. This means that the object point to be reconstructed changes its position depending on the observer position. A change of the modulator region in dependence on the observer position allows the object point to be encoded at a fix position, i.e. its position in space does not change depending on the observer position. As far as the present invention is concerned, those principles can be applied analogously.

According to a most simple embodiment, the centre of the modulator region lies on the straight line which runs through the object point to be reconstructed and the centre of the visibility region. In a most simple embodiment, the size of the modulator region is determined based on the theorem of intersecting lines, where the visibility region is traced back through the object point to be reconstructed to the light modulator means. Also if sub-holograms are preferably used, a pixel, which represents the smallest controllable unit of the light modulator means, does not only comprise the information of a single sub-hologram, but, as a result of the superpositions, the information of multiple sub-holograms.

The present invention is based on the idea that the complex hologram values of a sub-hologram are computed in a modulator region of the light modulator means from the wave front of the object point to be reconstructed, in that the transmittance functions or modulation functions of a imaging element, which is modelled in the modulator region and in whose focal point the object point to be reconstructed lies, are computed and analysed.

The imaging element is therein located in the hologram plane of the holographic display device. The hologram plane is defined by the position of a screen means, where for simplification the screen means will be the light modulator itself in the following description.

According to a preferred embodiment of the method, the imaging element includes a lens which is disposed in the hologram plane, which has the focal length f and which is inclined. An inclined lens is composed of a lens which is not inclined in relation to the hologram plane and a prism which is effective in both the horizontal and vertical direction. Strictly speaking, a prism does not define a sub-hologram, because no object point is reconstructed due to the non-focal prism function. However, in order to maintain a certain clarity of the inventive thought, this will be described so, because the prism also contributes its part to the complex hologram values in the modulator range. The method will be described below in detail with the example of a lens and prism. Of course, the method also applies to a lens or prism on its own; in such case, the process steps or the corresponding terms are not carried out or are neglected. For computing the complex values of the sub-hologram, this detailing of the method comprises the following steps for each object point of the scene:

A: Determining the size and position of the modulator region as described above, but the modulator region will then be given a local coordinate system, where the point of origin is located in its centre, the x axis describes the abscissa and the y axis describes the ordinate. 'a' is the half-width and 'b' the half-height of the modulator region, where those interval boundaries are included in the following terms.

B: Determining the sub-hologram of the lens in the hologram plane:

B1: Determining the focal length f of the lens:
The focal length f of the lens preferably is the normal distance of the object point to be reconstructed from the hologram plane.

B2: Complex values of the corresponding sub-hologram of the lens:
The complex values of the corresponding sub-hologram are determined using the equation $$z_L = \exp\{+/-i*[(\pi/\lambda f)*(x^2+y^2)]\},$$

where $\lambda$ is the reference wavelength, f is the focal length and (x, y) is the corresponding coordinate pair. The negative sign here is due to the characteristic of a concave lens. A convex lens would be identified by a positive sign.

B3: Thanks to the symmetry in regard to the x and y axes, it is sufficient to determine the complex values in one quadrant and to apply the values to the other quadrants by using a rule of sign.

C: Determining the sub-holograms of the prisms (P) in the hologram plane:
The chosen prisms run through the abscissa or ordinate, as shown in the figures below.

C1: Determining the linear factor $C_x$ of the prism (PH) with horizontal effective direction, which is described by the following equation in the interval $x \in [-a, a]$:

$C_x = M*(2\pi/\lambda);$ where M is the inclination of the prism.

C2: Determining the linear factor $C_y$ of the prism (PV) with vertical effective direction, which is described by the following equation in the interval $y \in [-b, b]$ $C_y = N*(2\pi/\lambda);$ where N is the inclination of the prism.

C3: Determining the complex values of the corresponding sub-hologram of the combined prisms:

The complex values for the corresponding sub-hologram are determined by superposing the two prism terms:

$z_P = \exp\{i*[C_x*(x-a) + C_y*(y-b)]\}$

The superposed prism runs through the point of origin of the local coordinate system.

C4: A prism term can be omitted if the holographic display device exhibits the characteristic to image the light source into the visibility region.

D: Modulating the sub-holograms for lens and prism:

The complex values of the lens and prisms are complexly multiplied in order to determine the combined sub-hologram:

$z_{SH} = z_L * z_P$ or, symbolically, $SH = SH_L * SH_P$

E: Application of the random phase:

Each modulated sub-hologram from step D is assigned with a random phase in order to ensure a homogeneous brightness distribution in the visibility region. The random phase is added to the sub-hologram by way of a complex multiplication:

$z_{SH} := z_{SH} \exp(i\phi_0)$ or, symbolically, $SH := SH \exp(i\phi_0)$

The random phase is individually assigned to each sub-hologram. Globally, the random phases of all sub-holograms are preferably distributed homogeneously.

F: Intensity modulation:

The complex values are given an additional multiplication factor, which represents the intensity or brightness:

$z_{SH} = C * z_{SH}$ or, symbolically, $SH := C * SH;$

G: If the entire hologram is computed, the sub-holograms will be superposed so to form the entire hologram. In a simple embodiment, the sub-holograms are complexly added to the entire hologram, considering the position of the sub-holograms.

Entire hologram=complex sum of all sub-holograms with $H\Sigma_{SLM} = \Sigma SH_i$ or, symbolically, $z_{SLM} = \Sigma z_{SHi}$ (with regard to a global coordinate system)

The method is preferably used for visible object points only. The visibility of the object point is determined as a result of the rendering process of the scene by a 3D rendering graphics pipeline, and it depends on the observer position, that is the position of the eye pupils, and thus from the position of the visibility region, which is tracked to the position of the pupils.

The detailed description relates to the computation of the best possible solution. It is of course generally possible to replace the above-described function terms with more simple function terms, if a reduced reconstruction quality is accepted or even desired. However, it can be seen that updated process steps are applied in order to improve the reconstruction quality. Lenses or prisms can for example be chosen such to correct aberrations, tolerances of light modulator means etc. The same also applies to the exemplarily mentioned methods for determining the modulator region.

According to a continuation of this method, the pixel values for a specific holographic display device are found on the basis of the complex hologram values of the entire hologram (or of the sub-hologram). For example, the complex hologram values are converted into Burckhardt components, two-phase components or any other suitable code.

This method has the advantage that the object point to be reconstructed can be located at any position within the reconstruction space (frustum), and that its position is not approximated by way of discretisation, as for example when using section planes.

In addition to generating hologram values for the representation on a holographic display device, the method according to this invention is preferably used to fill look-up tables with the generated sub-holograms. A defined space is structured into object points, and the sub-hologram for each object point is stored in a look-up table. The above-mentioned space is for example the permitted or defined space where either the eye pupils of the observer can be located, or the reconstruction space (frustum) which stretches between the light modulator means and the visibility region. Such a generated look-up table makes it thus possible to retrieve a previously computed sub-hologram of an object point and to use it in the course of generating the hologram data. The look-up tables are preferably filled with the sub-holograms of the imaging element, that is of the combined lens and prism function. However, it is also thinkable that separate look-up tables are filled with sub-holograms related to the lens or prism functions, respectively. Generally, such look-up tables sustainably accelerate any other methods where the principle of sub-holograms is preferably employed as described for the method according to the present invention. Such look-up tables allow an acceleration of continuing methods or methods which require a great computational load, for example.

With the help of this method, object points for an interactive real-time holographic reconstruction can be generated at any position in the reconstruction space using standard hardware components which are commercially available today. If the processing unit on which the method is implemented has a higher performance, the scene can be structured more finely, and the quality of the reconstruction can be improved significantly. The method according to this invention omits complex transformations, which would otherwise be used, and it is characterised by a simple structure of steps which can be performed analytically. This also substantiates the real-time capability of the method according to this invention.

BRIEF DESCRIPTION OF THE DRAWINGS

The invention will now be explained in more detail with the help of embodiments and in conjunction with the accompanying drawings, wherein.

DETAILED DESCRIPTION

Figure 1:
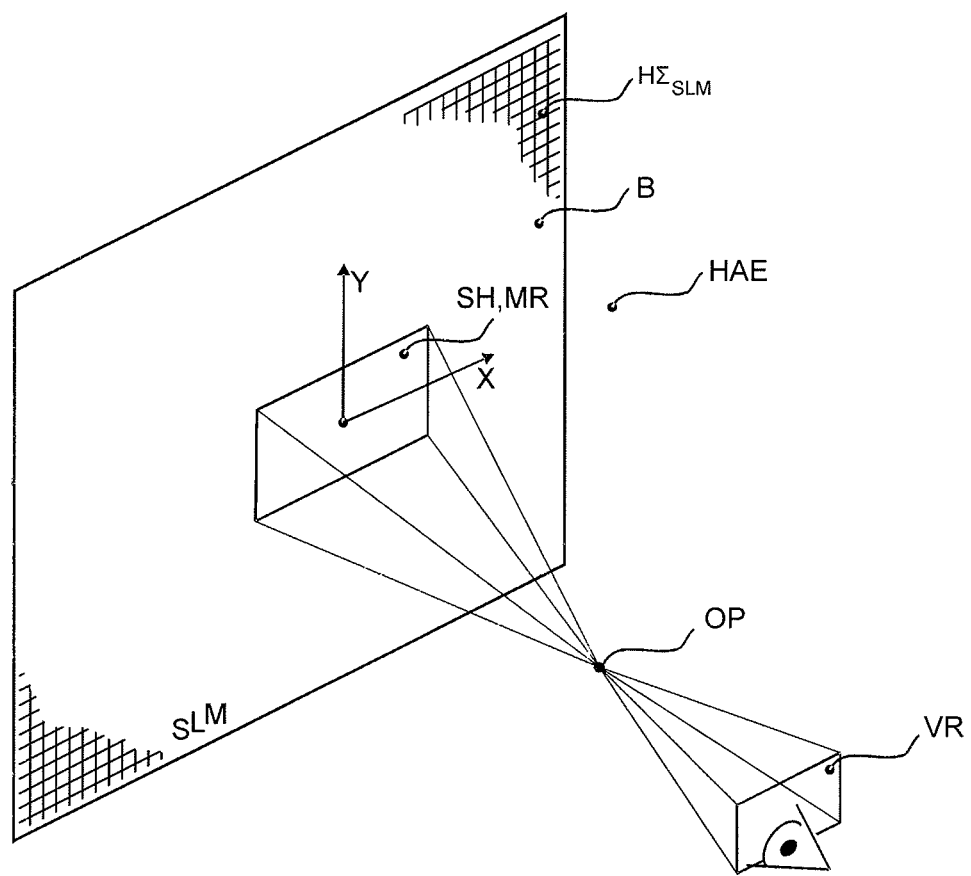
FIG. 1 illustrates the principle on which a holographic display device is based, and a modulator region representing an object point.

FIG. 1 illustrates the general principle on which a holographic display device (HAE) is based for one observer. The principle applies accordingly to multiple observers. The position of an observer is characterised by the position of his eye or his pupils (VP). The device comprises a light modulator means (SLM), which is identical to the screen means (B) in this embodiment in order to keep things simple; and it superposes the wave fronts which are modulated with information of object points of a scene (3D-S) in at least one visibility region (VR). The visibility region is tracked to the eyes. The reconstruction of a single object point (OP) of a scene (3D S) only requires one sub-hologram (SH) as a subset of the entire hologram ($H\Sigma_{SLM}$) encoded on light modulator means (SLM). The modulator region (MR) is the region of the sub-hologram on the light modulator (SLM). As can be seen in this Figure, the modulator region (MR) only comprises a small subsection of the light modulator means (SLM). According to a most simple embodiment, the centre of the modulator region (MR) lies on the straight line through the object point (OP) to be reconstructed and through the centre of the visibility region (VR). In a most simple embodiment, the size of the modulator region (MR) is determined based on the theorem of intersecting lines, where the visibility region (VR) is traced back through the object point (OP) to be reconstructed to the light modulator means (SLM). Further, the indices of those pixels on the light modulator means (SLM) which are required to reconstruct this object point are thus determined. As can be seen in the Figure, the modulator region (MR) will be given a coordinate system, where the point of origin is located in its centre, the x axis describes the abscissa and the y axis describes the ordinate. The modulator region (MR) has the half-width 'a' and the half-height 'b'.

Figure 2A:
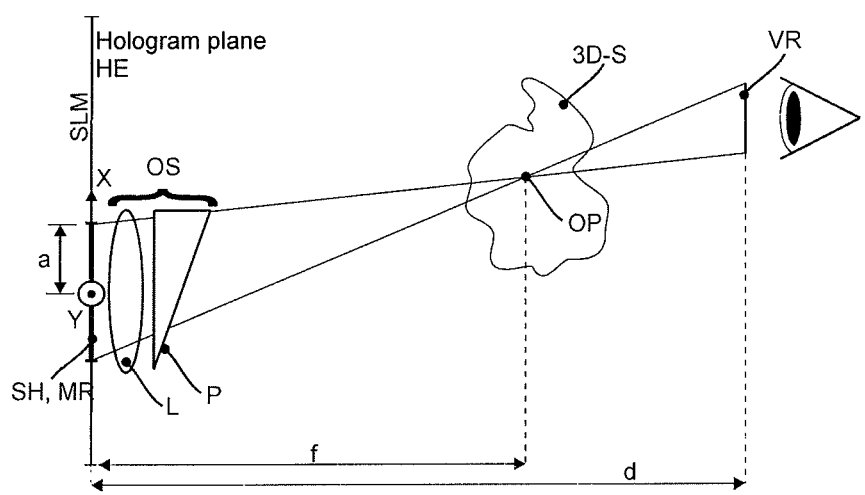
FIG. 2a is a side view of the display device with an imaging element comprising a lens and prism.

FIG. 2a is a side view of the holographic display device (HAE) that illustrates the general principle of the method. The modulator region (MR) is derived in analogy to what was said under FIG. 1. This region is located in the hologram plane (HE), where the light modulator (SLM) is disposed. The imaging element (OS), which is here composed of a focussing lens (L) and a prism (P), lies in the modulator region (MR). The Figure only shows the vertically effective prism wedge, and the imaging element (OS) is shown in front of the light modulator means (SLM) to make things clearer.

Figure 2B:
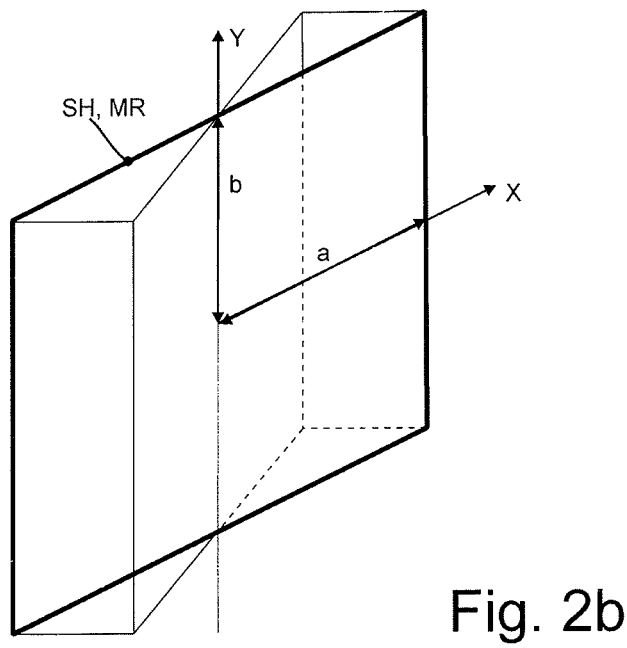
FIG. 2b shows a modulator region and a vertically effective prism.

FIG. 2b shows a horizontally effective prism wedge (PH) in front of the modulator region (MR) together with the coordinates and dimensions used. The prism wedge here runs through the ordinate.

Figure 2C:
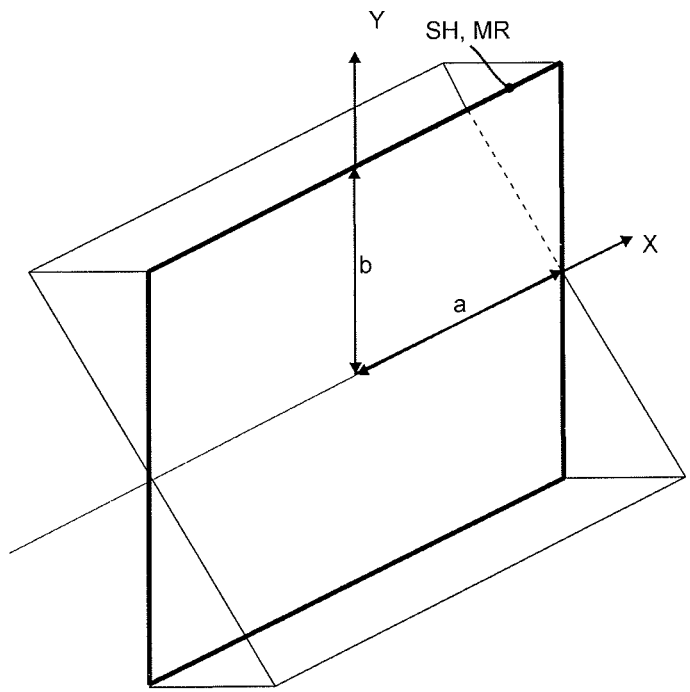
FIG. 2c shows a modulator region and a horizontally effective prism.

FIG. 2c analogously shows a vertically effective prism wedge (PV), which runs through the abscissa. The two prism wedges are superposed as described below.

Figure 3:
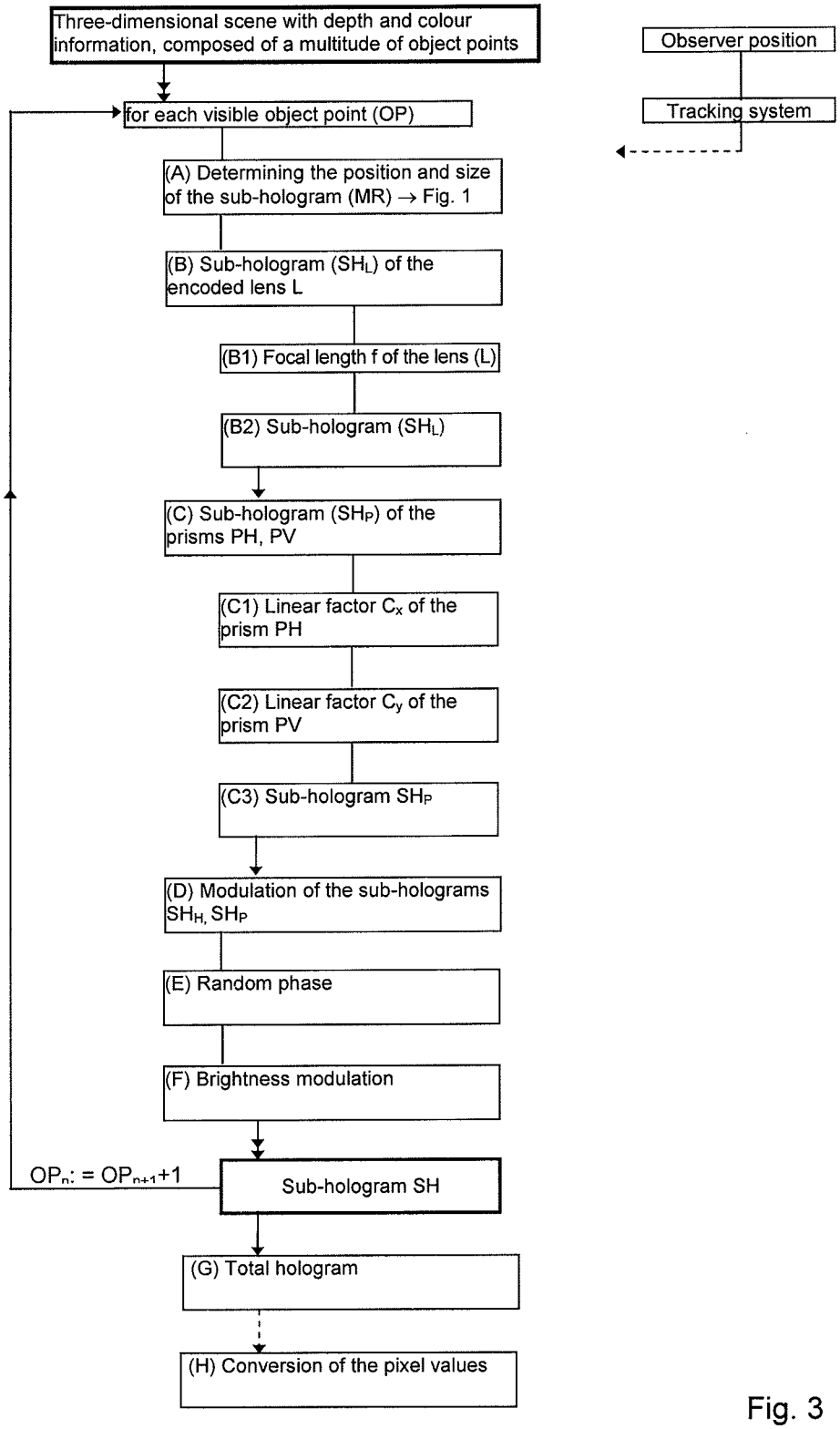
FIG. 3 shows a flowchart of the method according to this invention.

FIG. 3 shows a flowchart of the method according to the present invention. Starting point of the method is a three-dimensional scene (3D S) which is composed of a multitude of object points (OP). Colour and depth information is available for the object points (OP). The visibility of an object point is determined, based on its depth information, depending on the observer position, i.e. that of the eye pupils of the observer. In step (A), size and position of the respective modulator region (MR) in the hologram plane (HE) or on the light modulator means is determined for each visible object point. Following the idea of the invention, the object point (OP) to be reconstructed is interpreted as the focal point of an imaging element which is situated in the hologram plane, and the imaging element is considered to be a combination of a convex lens (L) and vertically and horizontally effective prisms (PV, PH), as shown in FIGS. 2b, 2c. The complex hologram values of the sub-hologram (SH) are computed in a modulator region (MR) of the light modulator means from the wave front of the object point (OP) to be reconstructed, in that the transmittance functions or modulation functions of the imaging element (OS), which is modelled in the modulator region (MR) and in whose focal point the object point (OP) to be reconstructed lies, are computed and analysed. In step (B1), the focal length of the lens (L) is thus determined for each visible object point as the normal distance of the object point (OP) from the hologram plane (HE).

In step (B2), the complex values for the corresponding sub-hologram ($SH_L$) are determined from $$z_L = \exp\{-i^*[(\pi/\lambda f)^*(x^2+y^2)]\}$$

where $\lambda$ is the reference wavelength, f is the focal length and (x, y) is the corresponding local coordinate pair. The coordinate system is defined as described above.

In step (C), the sub-holograms ($SH_P$) of the prisms (P) in the hologram plane are determined. The linear factor $C_x$ of the prism (PH) with horizontal effective direction is determined using the equation $$C_x = M^*(2\pi/\lambda),$$

where M is the inclination of the prism. The linear factor $C_y$ of the vertically effective prism is found with an analogous equation, but with the inclination N. The complex values of the corresponding sub-hologram ($SH_P$) are determined by superposing the two prism terms $$SH_P := z_P = \exp\{i^*[C_x^*(x-a)+C_y^*(y-b)]\}.$$

One prism term can be omitted if the holographic display device exhibits the characteristic to image the light source into the visibility region (VR).

Now that the sub-holograms ($SH_L$) of the lens (L) and ($SH_P$) of the prisms (P) are available, they are superposed in step (D) so to form the combined sub-hologram (SH) by complexly multiplying the complex values of the lens and of the prisms:

$$z_{SH} = z_L^* z_P$$

or, symbolically, $SH = SH_L^* SH_P$.

In step (E), the sub-hologram (SH) is given a homogeneously distributed random phase.

In step (F), an intensity modulation is performed, where the sub-hologram (SH) is multiplied with an intensity factor:

$$z_{SH} = C^* z_{SH}$$

or, symbolically, $SH := C^* SH$.

The combined sub-hologram (SH) of an object point (OP) is now completely available.

In a further process step (G), which may be performed separately, the sub-holograms of the object points are added so to form an entire hologram ($H\Sigma_{SLM}$). The individual sub-holograms ($SH_i$) of the object points are superposable and are complexly added so to form the entire hologram ($H\Sigma_{SLM}$).

Entire hologram=complex sum of all sub-holograms of the object points with $$H\Sigma_{SLM} = \Sigma\ SHi$$

or $z_{SLM} = \Sigma z_{SHi}$ (with regard to a global coordinate system).

The entire hologram ($H\Sigma_{SLM}$) represents the hologram of all object points. It thus represents and reconstructs the entire scene (3D S).

In a final step (H), as already described above, the entire hologram can by way of encoding be transformed into pixel values for a holographic display device which also preferably employs of the principle of sub-holograms. These are in particular, as already mentioned above, devices described in documents WO 2004/044659, WO 2006/027228, WO 2006119760, and DE 10 2006 004 300.

Figure 4:
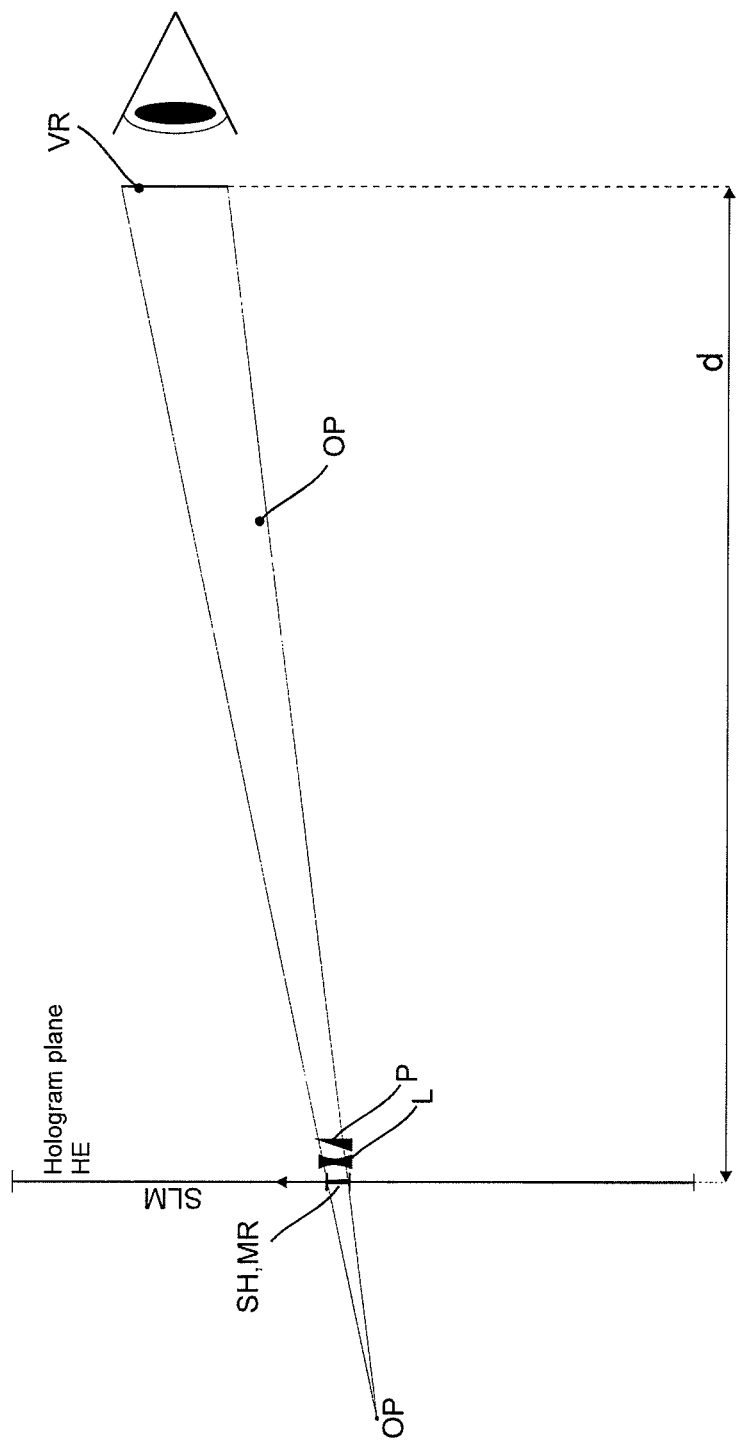
FIG. 4 shows an option of the method for the reconstruction of an object point behind the hologram plane.

FIG. 4 illustrates that by applying the method object points (OP) which are situated behind the hologram plane (HE) can generally be reconstructed analogously. In that case, the imaging element (OS) analogously comprises the mentioned prisms (P), but the lens in the imaging element is a concave lens (L), for which the wave front can be determined in the same way in the modulator region.

LIST OF REFERENCE NUMERALS

3D-S Scene
VR Visibility regions
OP Object point, general
$OP_n$ Object point, with reference index
SH Sub-hologram, general
$SH_L$ Sub-hologram of a lens
$SH_P$ Sub-hologram of a prism
MR Modulator region
$SH_i$ Sub-hologram, general, indexed
$H\Sigma_{SLM}$ Total hologram
HAE Holographic display device with
B Screen means
SLM Light modulator means
HE Hologram plane
VP Observer eyes/observer position
OS Projection element
L Lens
P Prism
PH Prism with horizontal effective direction
PV Prism with vertical effective direction

The invention claimed is:

1. A method for computing a video hologram of a scene to be reconstructed, which scene to be reconstructed comprises a multitude of object points for use in a holographic display device with at least one light modulator means, comprising:
    defining a visibility region within a periodicity interval of the video hologram of the scene to be reconstructed;
    for each object point, defining a modulator region by the defined visibility region together with each object point of the scene to be reconstructed, where a sub-hologram of an object point of the scene to be reconstructed is computed in each modulator region, and where the video hologram is created by superposition of said sub-holograms;
    determining complex hologram values of a sub-hologram in a modulator region from a wave front of an object point to be reconstructed; and
    computing and analyzing transmittance functions or modulation functions of an imaging element of said holographic display device, which is modelled in the modulator region, and which comprises at least one modelled prism, and in whose focal point the object points to be reconstructed lie, where the sub-hologram of said object points are computed using the transmittance or modulation functions.

2. The method according to claim 1, wherein the modelled imaging element comprises at least one modelled lens.

3. The method according to claim 2, comprising for each object point of the scene the following steps:
    A: Determining the size and position of the sub-hologram as a modulator region, which is given the half-width 'a' and the half-height 'b', and which is given local coordinates;
    B: Determining the sub-hologram of the modelled lens in the modulator region, comprising the steps of:
        B1: Determining the focal length f of the lens preferably as the normal distance of the object point to be reconstructed from the modulator region;
        B2: Determining the complex values of the corresponding sub-hologram of the lens using the equation $z_L = \exp\{+/-i*[(\pi/\lambda f)*(x^2+y^2)]\}$, where $\lambda$ is the reference wavelength, f is the focal length and (x, y) is the corresponding coordinate pair, and where the sign indicates a concave/convex lens;
    C: Determining the sub-holograms of the modelled prisms in the modulator region, comprising the steps of:
        C1: Determining the linear factor $C_x$ of the prism with horizontal effective direction, which is described by the following equation in the interval $x \in [-a, a]$ $C_x = M*(2\pi/\lambda)$, where M is the inclination of the prism;
        C2: Determining the linear factor $C_y$ of the prism with vertical effective direction, which is described by the following equation in the interval $y \in [-b, b]$ $C_y = N*(2\pi/\lambda)$, where N is the inclination of the prism;
        C3: Determining the complex values of the corresponding sub-hologram of the combined prisms by superposing the two prism terms $z_P = \exp\{i*[C_x*(x-a)+C_y*(y-b)]\}$;
    D: Superposition of the sub-hologram of the modelled lens and of the sub-hologram of the modelled prisms, where the complex values of the lens and of the prisms are multiplied with $z_{SH} = z_L * z_P$ or, symbolically, $SH = SH_L * SH_P$
    E: Application of the random phase, where each superposed sub-hologram is assigned with a random phase $\Phi_z$, and where a complex multiplication is performed with $z_{SH} := z_{SH} * \exp(i\Phi_z)$ or, symbolically, $SH := SH * \exp(i\Phi_z)$
    F: Intensity modulation, where the values of the modulated sub-hologram are given a real intensity factor C with $z_{SH} := C * z_{SH}$ or $SH := C*SH$.

4. The method according to claim 3, wherein, considering the position of the sub-holograms, their superposition to form a entire hologram is computed as the complex sum of the sub-holograms with $H\Sigma_{SLM} = \Sigma\ SH_i$.

5. The method according to claim 3, wherein each modulated sub-hologram of an object point is given a random phase, and the random phases of all sub-holograms are evenly distributed.

6. The method according to claim 3, wherein the position of the modulator region is determined in that the centre of the modulator region lies on the straight line through the object point to be reconstructed and the centre of the visibility region.

7. The method according to claim 3, wherein the size of the modulator range is determined by tracing back the visibility region through the object point to the light modulator means.

8. The method according to claim 1, wherein the complex hologram values are converted into pixel values of the light modulator means.

9. The method according to claim 8, wherein the complex hologram values are converted into Burckhardt components or two-phase components of the code.

10. A holographic display device with a computed video hologram of a scene which comprises a multitude of object points, with at least one light modulator means, and with a screen means, said device configured to perform the steps of:

defining a visibility region within a periodicity interval of the video hologram of the scene to be reconstructed;

for each object point, defining a modulator region by the defined visibility region together with each object point of the scene to be reconstructed, where a sub-hologram of an object point of the scene to be reconstructed is computed in each modulator region, and where the video hologram is created by superposition of said sub-holograms;

determining complex hologram values of a sub-hologram in a modulator region from a wave front of an object point to be reconstructed; and computing and analyzing transmittance functions or modulation functions of an imaging element of said holographic display device, which is modelled in the modulator region, and which comprises at least one modelled prism, and in whose focal point the object points to be reconstructed lie, where the sub-hologram of said object points are computed using the transmittance or modulation functions, wherein the screen means is the light modulator means itself on which the hologram of the scene is encoded.

11. The holographic display device according to claim 10, wherein the screen means is an optical element onto which is imaged a hologram which is encoded on the light modulator means, or a wave front of the scene which is encoded on the light modulator means.

12. The holographic display device according to claim 11, wherein the optical element is a lens or a mirror.

* * * * *